(12) United States Patent
Shi et al.

(10) Patent No.: US 12,602,225 B2
(45) Date of Patent: Apr. 14, 2026

(54) IDENTIFYING THE TRANSLATABILITY OF HARD-CODED STRINGS IN SOURCE CODE VIA POS TAGGING

(71) Applicant: International Business Machines Corporation, Armonk, NY (US)

(72) Inventors: Jin Shi, Ningbo (CN); Chih-Yuan Lin, Xindian Dist. (TW); Shu-Chih Chen, Banqiao Dist. (TW); Pei-Yi Lin, New Taipei City (TW); Chao Yuan Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 17/897,123

(22) Filed: Aug. 27, 2022

(65) Prior Publication Data

US 2024/0069912 A1     Feb. 29, 2024

(51) Int. Cl.
G06F 8/75 (2018.01)
G06F 40/216 (2020.01)
G06N 3/08 (2023.01)

(52) U.S. Cl.
CPC .............. G06F 8/75 (2013.01); G06F 40/216 (2020.01); *G06N 3/08* (2013.01)

(58) Field of Classification Search
CPC ............ G06F 8/75; G06F 40/216; G06N 3/08
See application file for complete search history.

(56) References Cited

U.S. PATENT DOCUMENTS 5,146,405 A * 9/1992 Church .................. G10L 13/10
704/9
10,078,504 B1 9/2018 Franovic et al.
10,339,029 B2 7/2019 Rameshwar et al.
10,929,277 B2 * 2/2021 Zang .................. G06F 11/3698
(Continued)

OTHER PUBLICATIONS

Laith H. Baniata, A Multitask-Based Neural Machine Translation Model with Part-of-Speech Tags Integration for Arabic Dialects, Dec. 5, 2018 (Year: 2018).*

(Continued)

*Primary Examiner* — Wei Y Mui
*Assistant Examiner* — Amir Soltanzadeh
(74) *Attorney, Agent, or Firm* — Kelsey M. Skodje

(57) ABSTRACT

A method for identifying hard-coded strings in source code is disclosed. In one embodiment, such a method parses source code and associated localization resource files to identify hard-coded strings and their associated context. The method provides a confidence score for each hard-coded string that indicates whether the hard-coded string is translatable or non-translatable. Based on the confidence score for each hard-coded string, the method transforms each hard-coded string into a single equivalence word. The method then prepares training data by tagging the hard-coded strings in the source code and associated localization resource files as one of translatable and non-translatable. The method then trains a parts-of-speech (POS) tagging model using the training data. At runtime, the method fetches potential hard-coded strings and tags each hard-coded string as one of translatable and non-translatable using the POS tagging model. A corresponding system and computer program product are also disclosed.

18 Claims, 7 Drawing Sheets

(56) References Cited

U.S. PATENT DOCUMENTS

| | | | |
|---|---|---|---|
| 2013/0007588 A1* | 1/2013 | Guo | G06F 11/3688 |
| | | | 715/234 |
| 2016/0048506 A1 | 2/2016 | Levi et al. | |
| 2017/0169015 A1* | 6/2017 | Huang | G06F 40/51 |
| 2018/0307683 A1 | 10/2018 | Lipka et al. | |
| 2023/0024040 A1* | 1/2023 | Muralidharan | G06N 20/00 |
| 2023/0134796 A1* | 5/2023 | Bhatnagar | G06N 20/20 |
| | | | 704/9 |
| 2025/0278881 A1* | 9/2025 | Zhuo | G06F 40/30 |

OTHER PUBLICATIONS

Oasis, XLIFF 1.2 Representation Guide for Gettext PO, Oct. 16, 2006 (Year: 2006).*

Ynion, Jose Cezar, Using AI in Automated UI Localization Testing of a Mobile App, Master's Thesis for Metropolia University of Applied Sciences, Apr. 7, 2020.

Muntes-Mulero, Victor, et al. "Context-Aware Machine Translation for Software Localization," 16th Annual conference of the European Association for Machine Translation, May 28, 2021.

Wang, Xiaoyin, et al. "TranStrL: An Automatic Need-to-Translate String Locator for Software Internationalization," 2009 IEEE 31st International Conference on Software Engineering, May 24, 2009.

* cited by examiner

100

| Computer 101 |
|---|

Processor Set 110

| Processing Circuitry 120 | Cache 121 |
|---|---|

Communication Fabric 111

Volatile Memory 112

Persistent Storage 113

| Operating System 122 | Hard-Coded String Management Module 150 |
|---|---|

Peripheral Device Set 114

| UI Device Set 123 | Storage 124 | IoT Sensor Set 125 |
|---|---|---|

Network Module 115

WAN 102

End User Device 103

Remote Server 104

Remote Database 130

Private Cloud 106

Gateway 140

Public Cloud 105

| Cloud Orchestration Module 141 | Host Physical Machine Set 142 |
|---|---|
| Virtual Machine Set 143 | Container Set 144 |

Fig. 1

200

Parse source code and associated localization resource files to identify hard-coded strings and their associated context 202

> Utilize first layer parser to retrieve resourced-out strings and their associated context from the source code and associated localization resource files 204

> Utilize second layer parser to retrieve intended hard-coded strings and their associated context from the source code 206

Calculate a confidence score for each hard-coded string indicating a degree of translatability 208

Based on the confidence score for each hard-coded string, transform each hard-coded string into a single equivalence word 210

Prepare training data by tagging hard-coded strings in the source code and localization resource files as one of translatable and non-translatable 212

> Build positive training data using resourced-out strings and their associated context 214

> Build negative training data using intended hard-coded strings and their associated context 216

Train a part-of-speech (POS) tagging model using the training data 218

At runtime, fetch potential hard-coded strings and tag each hard-coded string as one of translatable and non-translatable using the POS tagging model 220

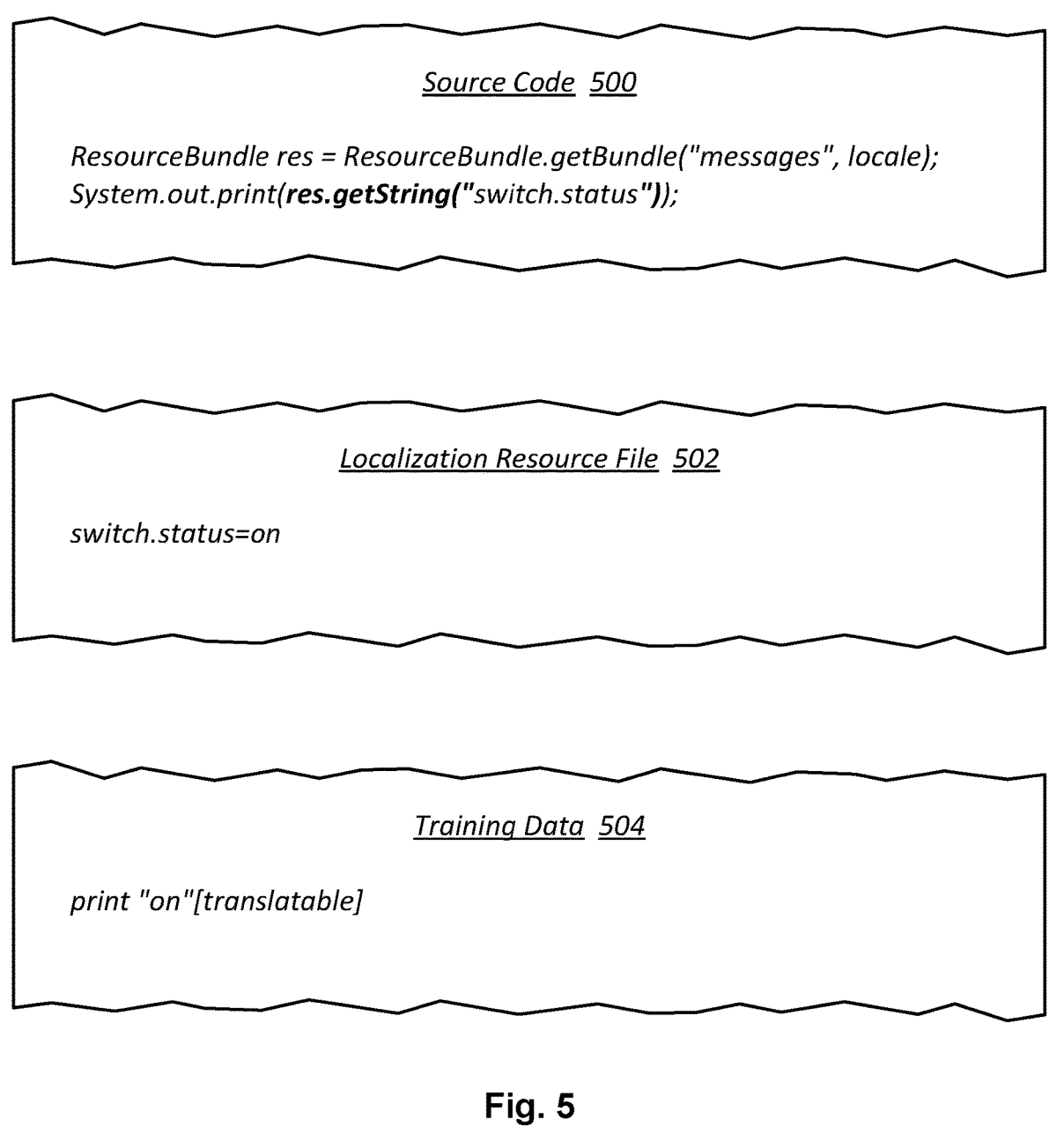

*Source Code*  *500*

*ResourceBundle res = ResourceBundle.getBundle("messages", locale);*
*System.out.print(res.getString("switch.status"));*

*Localization Resource File*  *502*

*switch.status=on*

*Training Data*  *504*

*print "on"[translatable]*

Fig. 5

*Source Code*  *500*

*<div class="on"/>*

*Training Data*  *504*

*class "on"[non-translatable]*

Fig. 6

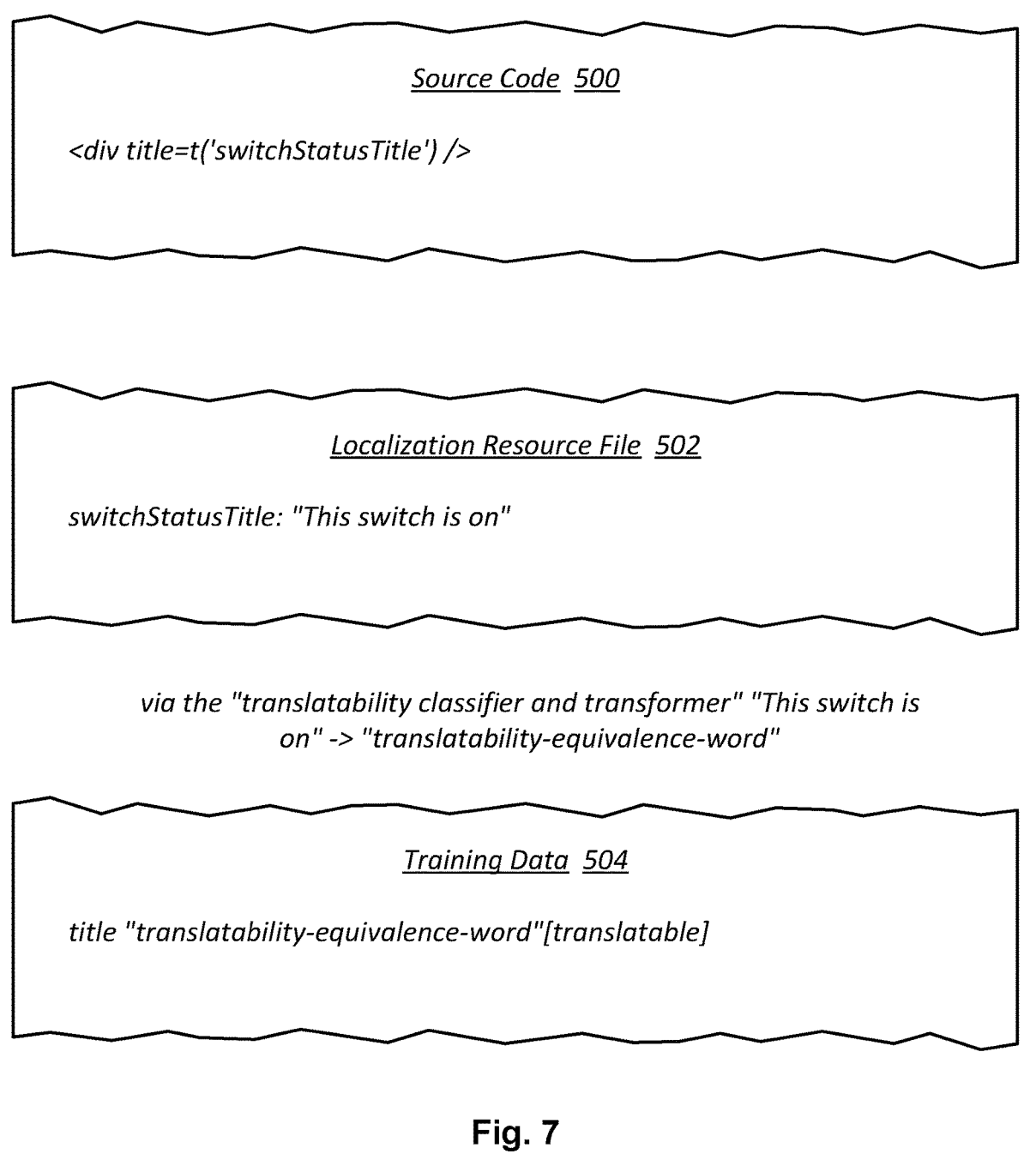

*Source Code  500*

*<div title=t('switchStatusTitle') />*

*Localization Resource File  502*

*switchStatusTitle: "This switch is on"*

*via the "translatability classifier and transformer" "This switch is on" -> "translatability-equivalence-word"*

*Training Data  504*

*title "translatability-equivalence-word"[translatable]*

Fig. 7

IDENTIFYING THE TRANSLATABILITY OF HARD-CODED STRINGS IN SOURCE CODE VIA POS TAGGING

BACKGROUND

Field of the Invention

This invention relates to systems and methods for identifying the translatability of hard-coded strings in source code.

Background of the Invention

Software localization typically involves processes for adapting software to a culture and/or language of an end user. This may also involve adapting elements such as standards of measurement, video, and graphic design. In general, software localization may involve much more than language translation and may include changing the design and user interface of software to make the software look and feel more natural to a target end user. Software localization when done properly has the ability enhance a user experience associated with software for end users all over the world.

When performing software localization, one issue that typically arises is how to handle hard-coded strings in the user interface. Locating and translating these hard-coded strings can take a significant amount of time and effort. One possibility for dealing with these hard-coded strings is to use rule-based code analysis to search for and translate the hard-coded strings to another language. However, this technique typically requires developing rules for different programming languages. This technique is also time-consuming and error prone.

SUMMARY

The invention has been developed in response to the present state of the art and, in particular, in response to the problems and needs in the art that have not yet been fully solved by currently available systems and methods. Accordingly, systems and methods have been developed for identifying the translatability of hard-coded strings in source code. The features and advantages of the invention will become more fully apparent from the following description and appended claims, or may be learned by practice of the invention as set forth hereinafter.

Consistent with the foregoing, a method for identifying hard-coded strings in source code is disclosed. In one embodiment, such a method parses source code and associated localization resource files to identify hard-coded strings and their associated context. In certain embodiments, the context includes one or more words in the source code or localization resource files that precede the hard-coded strings. In certain embodiments, the parsing step uses a first layer parser to retrieve resourced-out strings and their associated context from the source code and associated localization resource files, and a second layer parser to retrieve intended hard-coded strings and their associated context from the source code.

The method provides a confidence score for each hard-coded string that indicates whether the hard-coded string is translatable or non-translatable. Based on the confidence score for each hard-coded string, the method transforms each hard-coded string into a single equivalence word.

The method then prepares training data by tagging the hard-coded strings in the source code and associated localization resource files as one of translatable and non-translatable. In certain embodiments, preparing the training data may include building positive training data using resourced-out strings and their associated context, and building negative training data using intended hard-coded strings and their associated context.

The method then trains a parts-of-speech (POS) tagging model using the training data. In certain embodiments, the POS tagging model uses probabilistic methods or deep learning methods to tag the potential hard-coded strings as translatable or non-translatable. At runtime, the method fetches potential hard-coded strings and tags each hard-coded string as one of translatable and non-translatable using the POS tagging model.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 1 is a high-level block diagram showing one example of a computing system for use in implementing embodiments of the invention;

FIG. 2 is a process flow diagram showing one embodiment of a method in accordance with the invention;

FIG. 5 shows a first example of source code, a localization resource file, and training data for a hard-coded string that is deemed to be translatable;

FIG. 6 shows a second example of source code and training data for a hard-coded string that is deemed to be non-translatable; and FIG. 7 shows a third example of source code, a localization resource file, and training data for a hard-coded string and associated equivalence word that is deemed to be translatable.

DETAILED DESCRIPTION

Figure 3:
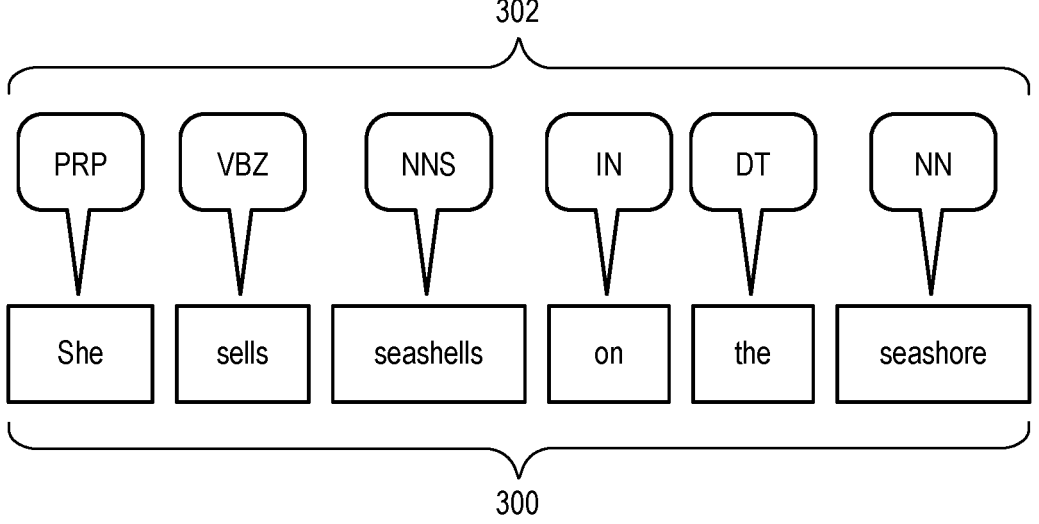
FIG. 3 is a high-level block diagram showing one example of a conventional part-of-speech tagging model.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code associated with the illustrated hard-coded string management module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, as previously mentioned, software localization typically involves processes for adapting software to the culture and/or language of an end user. This may involve adapting elements such as standards of measurement, video, and graphic design, to the end user. Software localization may involve much more than language translation. It may also include changing the design and user interface of software to make the software look and feel more natural to a target end user. Software localization when done properly has the ability enhance the user experience associated with software for end users all over the world.

As also mentioned, when performing software localization, one issue that frequently arises is how to handle hard-coded strings in the user interface. Locating and translating these hard-coded strings can take a significant amount of effort and time. One possibility for dealing with these hard-coded strings is to use rule-based code analysis to search for and translate the hard-coded strings to another language. However, this technique typically requires developing rules for different programming languages. This technique is also time-consuming and error prone. In some cases, hard-coded strings may be translatable and in other cases the hard-coded strings are not translatable. In some cases, the context around the hard-coded strings may be needed to determine whether or not the hard-coded strings are translatable.

Figure 6:
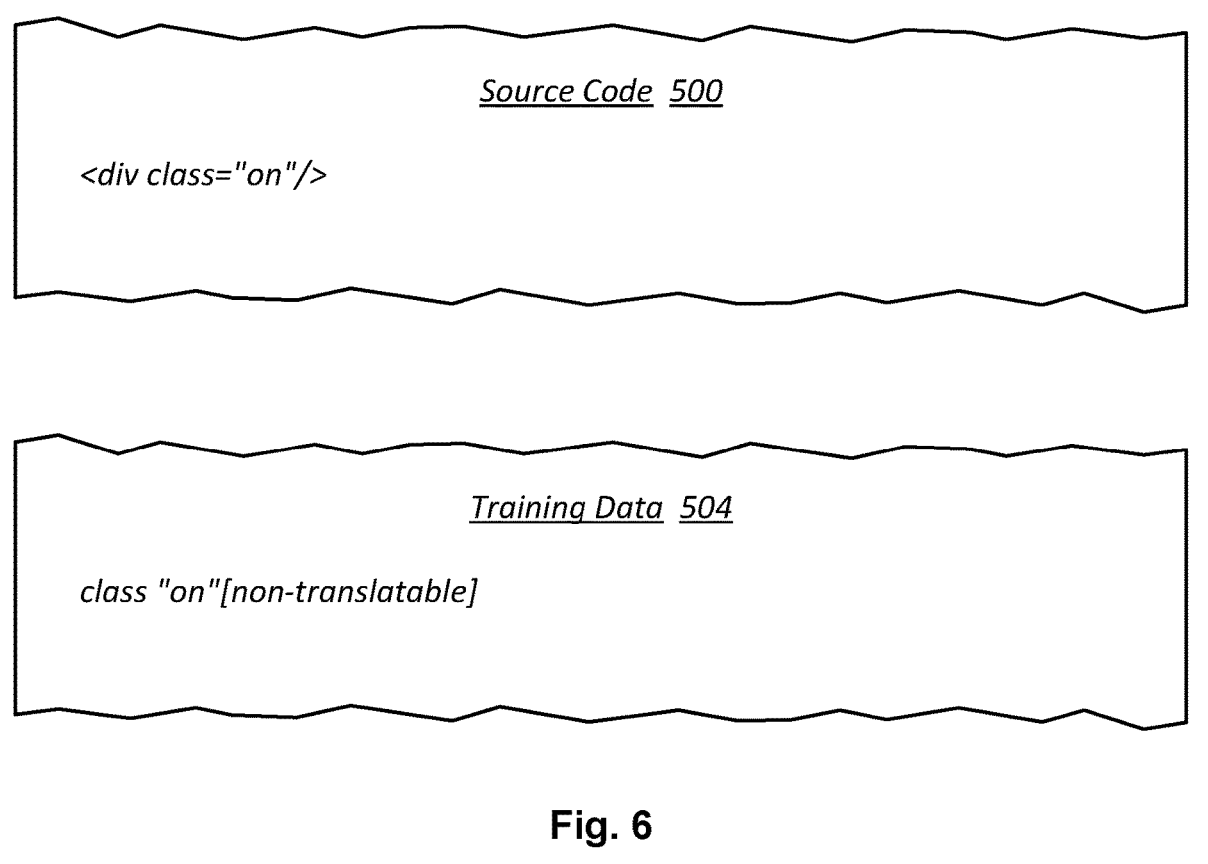

FIG. 2 shows one embodiment of a method 200 for identifying hard-coded strings in source code, as well as indicating whether the hard-coded strings are translatable or non-translatable. Such a method 200 may, in certain embodiments, be implemented by the hard-coded string management module 150 shown in FIG. 1. As shown, the method 200 begins with source code and associated localization resource files that contain one or more hard-coded strings. The method 200 then parses 202 the source code and associated localization resource files to identify hard-coded strings and associated context. In certain cases, the "context" includes one or more meaningful words or phrases that immediately precede the hard-coded string in the source code, possibly with some intervening separators (e.g., equal signs, parenthesis, etc.) that provide clues or hints as to whether the hard-coded string are translatable. Various examples of such context are shown in FIGS. 5 through 7.

In certain embodiments, the parsing step 202 includes utilizing 204 a first layer parser to retrieve resourced-out (i.e., externalized) strings and their associated context from the source code and associated localization resource files. The parsing step 202 may also include utilizing 206 a second layer parser to retrieve intended hard-coded strings and their associated context from the source code.

The method 200 may then, in certain embodiments, calculate 208 a confidence score for each hard-coded string. This confidence score may quantify (i.e., provide a level of confidence) as to whether a hard-coded string is translatable. In certain embodiments, no matter how high or low the confidence score, the score itself may not determine if the string is translatable or not—the context also matters. Based on the confidence score for the hard-coded string, the method 200 transforms 210 or maps each hard-coded string in the source code to a single "equivalence word."

Strings with different confidence scores can be mapped into different equivalence words. Based on a desired granularity, a set of equivalence words may be selected. For example, a confidence score between 0.1 and 0.4 may map to a first equivalence word; a confidence score between 0.5 and 0.7 may map to a second equivalence word; and a confidence score between 0.8 and 0.9 may map to a third equivalence word. It follows that a first string with a calculated confidence score of 0.8 may be transformed into the third equivalence word and a second string with a calculated confidence score of 0.2 may be transformed into the first equivalence word.

The method 200 may then prepare 212 training data by crawling the source code and tagging hard-coded strings in the source code and associated localization resource files as one of translatable and non-translatable. This training step 212 may include building positive training data using resourced-out strings and their associated context (i.e., hard-coded strings that are deemed to be translatable). This may also include building negative training data using intended hard-coded strings and their associated context (i.e., hard-coded strings that are deemed to be non-translatable). In certain embodiments, the training data may take the form of [context] [string value] [translatable/non-translatable tag].

In certain embodiments, the steps 202, 208, 210, and 212 are performed by a training set generator. This training set generator may be thought of as including a classifier, transformer, and a two-layer parser. The classifier may be configured to generate a confidence score indicating whether the words or terms of a hard-coded string are translatable or not. In certain embodiments, the classifier is trained with data from fully source code, of which all translatable strings have been externalized and all remaining potential hardcoded strings are deemed non-translatable.

Based on the confidence score, the transformer may map multiple words or terms of a string to a single independent equivalence word 400. The two-layer parser may include a first layer regular expression parser to fetch positive data, namely resourced-out (i.e., externalized) strings and their context in which the strings are tagged as translatable. The two-layer parser may further include a second layer parser to fetch negative data, namely intended hard-coded strings and their context in which the strings are tagged as non-translatable.

The method 200 then trains a part-of-speech (POS) tagging model using the training data. The part-of-speech tagging model may be trained to tag hard-coded string in source code as either translatable or non-translatable, similar to the way that conventional part-of-speech tagging models categorizes words in a text (corpus) with a particular part of speech depending on the definition of the word and its context within the text. One example of a part-of-speech tagging model will be discussed in association with FIG. 3. One example of a part-of-speech tagging model that has been adapted to tag hard-coded strings as either translatable or non-translatable will be discussed in association with FIG. 4. In general, systems and methods in accordance with the invention may leverage the functionality of part-of-speech tagging models in order to tag hard-coded strings as either translatable or non-translatable.

At runtime when source code and associated localization resource files are analyzed, the method 200 may fetch potential hard-coded strings from the source code and tag each potential hard-coded string as either translatable or non-translatable using the part-of-speech tagging model.

Referring to FIG. 3, one example of a part-of-speech tagging model is illustrated and described. As shown, the part-of-speech tagging model uses the Penn Treebank tag set to produce a tag 302 for each individual word or term in a string 300, in this example the string 300 "She sell seashells on the seashore." Such a part-of-speech tagging model may be one of the primary components of a natural language processing system.

Figure 4:
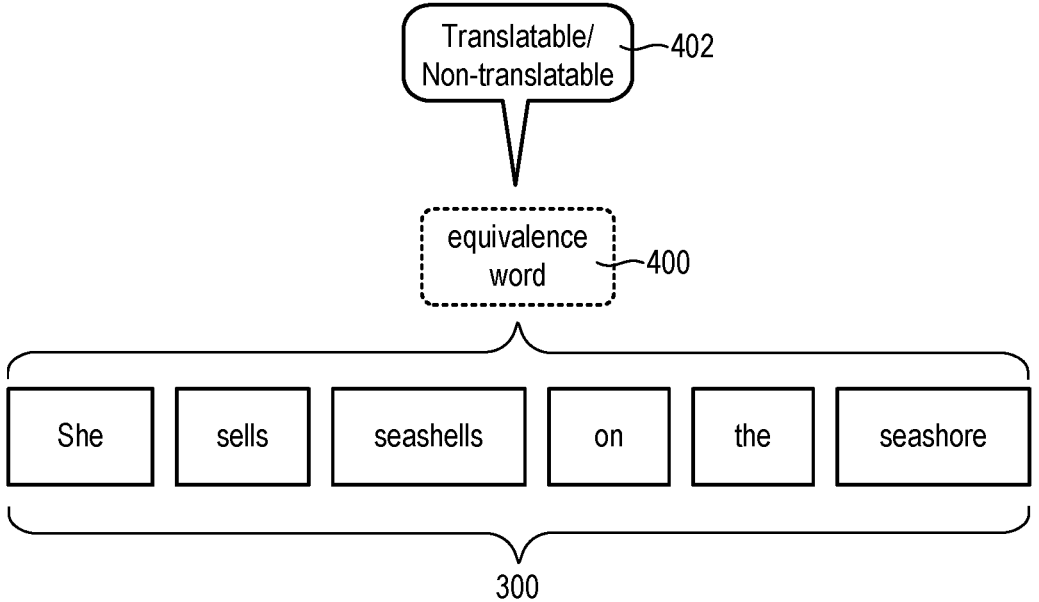
FIG. 4 is a high-level block diagram showing an example of a modified part-of-speech tagging model that labels a hard-coded string as one of translatable and non-translatable.

Referring to FIG. 4, as previously explained, in certain embodiments, a system and method in accordance with the invention may adapt a part-of-speech tagging model to identify hard-coded strings in source code as well as tag the hard-coded strings as either translatable or non-translatable. As shown, instead of tagging each individual word or term in a string 300, systems and methods in accordance with the invention may identify a hard-coded string in source code and, based on the words or terms in the hard-coded string as well as context surrounding the words and terms in the hard-coded string, provide a confidence score for the hard-coded string that identifies whether the hard-coded string is translatable or non-translatable. Based on this confidence score, systems and methods in accordance with the invention may transform the string into a single equivalence word 400. This equivalence word 400 may then be tagged 402 as either translatable or non-translatable. This essentially tags the entire string 300 as either translatable or non-translatable in the source code.

FIG. 5 shows various snippets of source code 500, a localization resource file 502, and training data 504 for a hard-coded string that is deemed to be translatable. As shown, the source code 500 is written in the Java programming language and includes the statement "System.out-.print" that prints an argument that is passed to it, in this example the argument "(res.getString("switch.status"))," which is resourced-out (i.e., externalized) to fetch the string "on" from the localization resource file 502. Based on the context of the string in the source code 500, in this example the method "print" that precedes the string (with an intervening parentheses separator), the string is determined to be "translatable." Training data 504 may be prepared by tagging the string as "translatable" in the source code 500. As shown, the training data 504 is presented in the form of [context] [string value] [translatable/non-translatable tag].

FIG. 6 shows snippets of source code 500 and training data 504 for an intended hard-coded string that is deemed to be non-translatable. As shown, the source code 500 includes an HTML tag with an attribute named "class." The class attribute is set to "on". In this embodiment, the string "on" is an intended hard-coded string. The context preceding the string (i.e., "class"), set apart from the string by an equals sign separator, may be used to ascertain that the string is non-translatable. Training data 504 may be prepared by tagging the intended hard-coded string as "non-translatable" in the source code 500.

FIG. 7 shows various snippets of source code 500, a localization resource file 502, and training data 504 for a hard-coded string that is deemed to be translatable. As shown, the source code 500 includes the HTML, tag "div" with an attribute named "title" and its value. In this example, the argument ('switchStatusTitle') retrieves a resourced-out (i.e., externalized) string from a localization resource file 502, in this example the string "This switch is on." In this example the string includes multiple terms. Based at least partly on the context preceding the string, in this example the term "title" which is set apart from the string by the separators "=t(", a confidence score is generated to indicate the degree to which the string is translatable. This confidence score may be used to transform the string into a single equivalence word 400. This equivalence word 400 may then be tagged as either translatable or non-translatable. In this example, the string is deemed to be translatable at least partly due to the sting's context. Training data 504 may be prepared by tagging the string, and more specifically the equivalence word 400 of the string, as "translatable" in the source code 500.

The described systems and methods are more precise and cost-effective than current methods for identifying hard-coded string and their translatability within source code 500. In particular, the described systems and methods are more precise since context is taken into account when determining the translatability or non-translatability of a string. The systems and methods are more cost-effective at least partly because they eliminate the need to create parsers for each programming language, where the type and quantity of separators can vary significantly. The systems and methods also eliminate or reduce the need to identify context values by language. The systems and methods also eliminate or reduce the need to design rules (e.g., regular expressions) on a case-by-base basis. By using a well-known and fully explored question domain, systems and methods in accordance with the invention are able to utilize solutions to part-of-speech tagging problems using, for example, probabilistic or deep-learning methods, to determine the translatability or non-translatability of hard-coded strings.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for localizing software, the method comprising:

preparing a set of training data, wherein the preparing comprises:

parsing source code and associated localization resource files to identify hard-coded strings and their associated context;

providing a confidence score for each hard-coded string indicating a likelihood of the hard-coded string being translatable, wherein the confidence score is determined at least in part based on the associated context;

based on the confidence score for each hard-coded string, transforming each hard-coded string into a single equivalence word from a set of equivalence words mapped to confidence scores;

tagging the hard-coded strings in the source code and associated localization resource files as one of translatable and non-translatable, wherein the tagging tags the single equivalence word of each hard-coded string; and building positive training data using resourced-out strings from the hard-coded strings tagged as translatable;

training a parts-of-speech (POS) tagging model using the training data;

at runtime, by the POS tagging model, locating translatable hard-coded strings in source code of the software, wherein the locating comprises fetching potential hard-coded strings and their associated contexts and tagging each potential hard-coded string as one of translatable and non-translatable using the POS tagging model;

translating the located translatable hard-coded strings; and adapting elements of a user interface using the translated hard-coded strings.

2. The method of claim 1, wherein parsing the source code and associated localization resource files comprises utilizing a first layer parser to retrieve resourced-out strings and their associated context from the source code and associated localization resource files.

3. The method of claim 1, wherein parsing the source code and associated localization resource files comprises utilizing a second layer parser to retrieve intended hard-coded strings and their associated context from the source code.

4. The method of claim 1, wherein the context comprises at least one word preceding the hard-coded strings.

5. The method of claim 1, wherein the POS tagging model uses one of probabilistic methods and deep learning methods to tag the potential hard-coded strings as one of translatable and non-translatable.

6. The method of claim 1, wherein preparing the training data further comprises building negative training data using intended hard-coded strings and their associated context.

7. A computer program product for localizing software, the computer program product comprising a computer-readable storage medium having computer-usable program code embodied therein, the computer-usable program code configured to perform the following when executed by at least one processor:

prepare a set of training data, wherein the preparing the set of training data comprises:

parsing source code and associated localization resource files to identify hard-coded strings and their associated contexts;

based on the associated contexts, provide a confidence score for each hard-coded string indicating a likelihood of the hard-coded string being translatable, wherein the confidence score is determined at least in part based on the associated context;

based on the confidence score for each hard-coded string, transforming each hard-coded string into a single equivalence word from a set of equivalence words mapped to confidence scores;

tagging the hard-coded strings in the source code and associated localization resource files as one of translatable and non-translatable, wherein the tagging tags the single equivalence word of each hard-coded string; and build positive training data using resourced-out strings from the hard-coded strings tagged as translatable;

train a parts-of-speech (POS) tagging model using the training data;

at runtime, by the POS tagging model, locate translatable hard-coded strings in source code of the software, wherein the locating comprises fetching potential hard-coded strings and their associated contexts and tagging each potential hard-coded string as one of translatable and non-translatable using the POS tagging model:

translate the located translatable hard-coded strings; and adapt elements of a user interface using the translated hard-coded strings.

8. The computer program product of claim 7, wherein parsing the source code and associated localization resource files comprises utilizing a first layer parser to retrieve the resourced-out strings and their associated context from the source code and associated localization resource files.

9. The computer program product of claim 7, wherein parsing the source code and associated localization resource files comprises utilizing a second layer parser to retrieve intended hard-coded strings and their associated context from the source code.

10. The computer program product of claim 7, wherein the context comprises at least one word preceding the hard-coded strings.

11. The computer program product of claim 7, wherein the POS tagging model uses one of probabilistic methods and deep learning methods to tag the potential hard-coded strings as one of translatable and non-translatable.

12. The computer program product of claim 7, wherein preparing the training data further comprises building negative training data using intended hard-coded strings and their associated context.

13. A system for localizing software, the system comprising:

at least one processor; and at least one memory device operably coupled to the at least one processor and storing instructions for execution on the at least one processor, the instructions causing the at least one processor to:

prepare a set of training data, wherein the instructions causing the at least one processor to prepare the set of training data comprise instructions causing the at least one processor to:

parse source code and associated localization resource files to identify hard-coded strings and their associated context;

provide a confidence score for each hard-coded string indicating a likelihood of the hard-coded string being translatable, wherein the confidence score is determined at least in part based on the associated context;

based on the confidence score for each hard-coded string, transform each hard-coded string into a single equivalence word from a set of equivalence words mapped to confidence scores;

tag the hard-coded strings in the source code and associated localization resource files as one of translatable and non-translatable, wherein the tagging tags the single equivalence word of each hard-coded string; and build positive training data using resourced-out strings from the hard-coded strings tagged as translatable;

train a parts-of-speech (POS) tagging model using the training data;

at runtime, by the POS tagging model, locate translatable hard-coded strings in source code of the software, wherein the locating comprises fetching potential hard-coded strings and their associated contexts and tagging each potential hard-coded string as one of translatable and non-translatable using the POS tagging model;

translate the located translatable hard-coded strings; and adapt elements of a user interface using the translated hard-coded strings.

14. The system of claim 13, wherein parsing the source code and associated localization resource files comprises utilizing a first layer parser to retrieve the resourced-out strings and their associated context from the source code and associated localization resource files.

15. The system of claim 13, wherein parsing the source code and associated localization resource files comprises utilizing a second layer parser to retrieve intended hard-coded strings and their associated context from the source code.

16. The system of claim 13, wherein the context comprises at least one word preceding the hard-coded strings.

17. The system of claim 13, wherein the POS tagging model uses one of probabilistic methods and deep learning methods to tag the potential hard-coded strings as one of translatable and non-translatable.

18. The system of claim 13, wherein preparing the training data further comprises building negative training data using intended hard-coded strings and their associated context.

* * * * *